United States Patent [19]

Dillon et al.

[11] 4,338,634

[45] Jul. 6, 1982

[54] FRAME-RATE CONVERTING FILM SCANNER WITH TWO-DIMENSIONAL SOLID STATE IMAGE SENSING ARRAY

[75] Inventors: Peter L. P. Dillon; Evan A. Edwards, both of Pittsford, N.Y.; Richard A. Spaulding, Longwood, Fla.

[73] Assignee: Eastman Kodak Company, Rochester, N.Y.

[21] Appl. No.: 207,813

[22] Filed: Nov. 17, 1980

[51] Int. Cl.³ .............................................. H04N 3/36
[52] U.S. Cl. ..................................................... 358/214
[58] Field of Search ............................... 358/214–216, 358/54

[56] References Cited

PUBLICATIONS

Wright, "Solid State Sensors: The Use of a Single Dimension 512-Element Array for Film Scanning", BBC Research Dept., Report No. 1973/32.
Childs et al., "An Experimental Telecine Using a Line Array CCD Sensor", *SMPTE Journal*, vol. 87, No. 4, Apr. 1978, pp. 209–213.

*Primary Examiner*—John C. Martin
*Attorney, Agent, or Firm*—Thomas H. Close

[57] ABSTRACT

A frame-rate converting film scanner includes means for continuously advancing film at a selected frame rate and for projecting an image of the moving film onto a solid state image sensor for producing a television signal at a standard television field rate. The solid state image sensor includes: (1) a two-dimensional array of image sensing elements having a width equal to the width of the projected image of a film frame and a height equal ot the projected image of 2+X/Y film frames, where X is the projection rate of the film in frames per second and Y is the field rate of the standard video signal in fields per second, (2) a two-dimensional frame storage array, (3) an output register, and (4) a "drain gate" disposed between the image sensing array and the frame storage array and operable in a first mode to transfer signals from the image sensing array to the storage array and in a second mode to drain signals from the image sensing array. The image of the moving film is projected on the image sensing array to produce an imagewise pattern of photocharge and the sensing array is operated to move the pattern of photocharge accumulated in the array in synchronism with the moving image. As lines of photocharge are advanced to the top of the sensing array, they are dumped by the drain gate. After a predetermined exposure time, a full frame of photocharge is rapidly transferred to the temporary storage array from the image sensing array via the drain gate. The frame of photocharge is read out of the storage array at the standard video field rate via the output register while a new pattern of photocharge is accumulated in the image sensing array. The scanning apparatus includes timing means for keeping track of the location of moving film frames with respect to the image sensing array and clocking means associated with the timing means for rapidly shifting a complete frame's worth of charge into the temporary storage array.

4 Claims, 5 Drawing Figures

FRAME-RATE CONVERTING FILM SCANNER WITH TWO-DIMENSIONAL SOLID STATE IMAGE SENSING ARRAY

BACKGROUND OF THE INVENTION

1. Field of the Invention

This invention relates to film scanners, and more particularly, to frame-rate converting scanners for scanning a motion picture film projected at a selected frame rate, e.g. 18 frames per second, to produce a television signal at a standard field rate, e.g. 60 fields per second.

2. Discussion Related to the Problem

Apparatus for scanning motion picture film to produce a television signal is well known. In such film scanning apparatus, a film frame is scanned in a direction generally perpendicular to the length of the film at a standard television line rate. The line scan is displaced in a direction generally parallel with the length of the film at a standard television field rate. In the past, this scanning has been accomplished by a flying spot scanner such as a cathode ray tube. The use of a solid state image sensing array as an alternative to a CRT has been proposed. See, D. T. Wright, "Solid State Sensors; The Use of a Single Dimension 512-Element Array for Film Scanning", BBC Research Department Report No. 1973/32. The potential advantages of a solid state sensing array over a flying spot scanner are numerous, including: reduced size and weight; greater reliability; and lower cost. These advantages made a solid state image sensing array potentially attractive for use in a film scanner for displaying amateur movies on a home television set. However, since standard motion picture film frame rates are not the same as standard television field rates, the scanning apparatus must provide some form of frame-rate conversion, whereby the film is projected at a desired projection rate while the frames are scanned at a standard television field rate. It is also desirable in such a film scanner to provide several alternative projection rates such as stop action, slow motion, and fast forward.

One approach to frame-rate conversion suggested in the prior art is to scan the film one frame at a time at the projection rate, while storing the scanned information in a digital field store memory. The signal thus stored is repeatedly read out of the field store at the standard television rate a sufficient number of times to accomplish frame-rate conversion. Unfortunately, the addition of a digital field store memory and the attendant analog-to-digital converters and clocking means required to coordinate the read out of the sensor for projection rates that are not integer submultiples of the field rate greatly increases the cost and complexity of the scanning apparatus. Alternatively, it has been suggested to interpose a moving optical device such as a pivoting mirror or rotating optical polygon in the optical path between the film and the solid state sensing array, and to move the device in such a manner as to cause the array to scan the projected image of the film a plurality of times. See, I. Childs and J. Sanders, "An Experimental Telecine Using a Line-Array CCD Sensor," SMPTE Journal, Vol. 87, No. 4, April 1978. The addition of moving optics to the scanning system increases the cost of the system and introduces such problems as alignment, vibration, and extreme manufacturing tolerances on the optical surfaces of the moving element. Furthermore, this scheme may work very nicely when the field rate is a whole number multiple of the projection rate, but complications arise when it is otherwise. The goal of the inventors, therefore, was to provide a frame-rate converting film scanner capable of accomplishing several projection rates while avoiding the use of costly digital field store memories or moving optical elements.

SOLUTION—SUMMARY OF THE INVENTION

The above-noted problems are solved according to the present invention by a frame rate converting film scanner including means for continuously advancing film at a selected frame rate and for projecting an image of the moving film onto a solid state image sensor for producing a television signal at a standard television field rate. The solid state image sensor includes: (1) a two-dimensional array of image sensing elements having a width equal to the width of the projected image of a film frame and a height equal to the projected image of $2+X/Y$ film frames, where X is the projection rate of the film in frames per second and Y is the field rate of the standard video signal in fields per second, (2) a two-dimensional frame storage array, (3) an output register, and (4) a "drain gate" disposed between the image sensing array and the frame storage array and operable in a first mode to transfer signals from the image sensing array to the storage array and in a second mode to drain signals from the image sensing array. The image of the moving film is projected on the image sensing array to produce an imagewise pattern of photocharge and the sensing array is operated to move the pattern of photocharge accumulated in the array in synchronism with the moving image. As lines of photocharge are advanced to the top of the sensing array, they are dumped by the drain gate. After a predetermined exposure time, a full frame of photocharge is rapidly transferred to the temporary storage array from the image sensing array via the drain gate. The frame of photocharge is read out of the storage array at the standard video field rate via the output register while a new pattern of photocharge is accumulated in the image sensing array. The scanning apparatus includes timing means for keeping track of the location of moving film frames with respect to the image sensing array and clocking means associated with the timing means for rapidly shifting a complete frame's worth of charge into the temporary storage array. Projection rates between zero frames per second and X frames per second are achievable in this way.

In a preferred embodiment of the invention, the solid state image sensor is a CCD device of the frame transfer type and the photosensitive area is three frames high, allowing projection rates between zero and 60 frames per second.

DESCRIPTION OF THE DRAWINGS

The invention will be described with reference to the drawings, wherein.

DESCRIPTION OF THE PREFERRED EMBODIMENT

Figure 1:
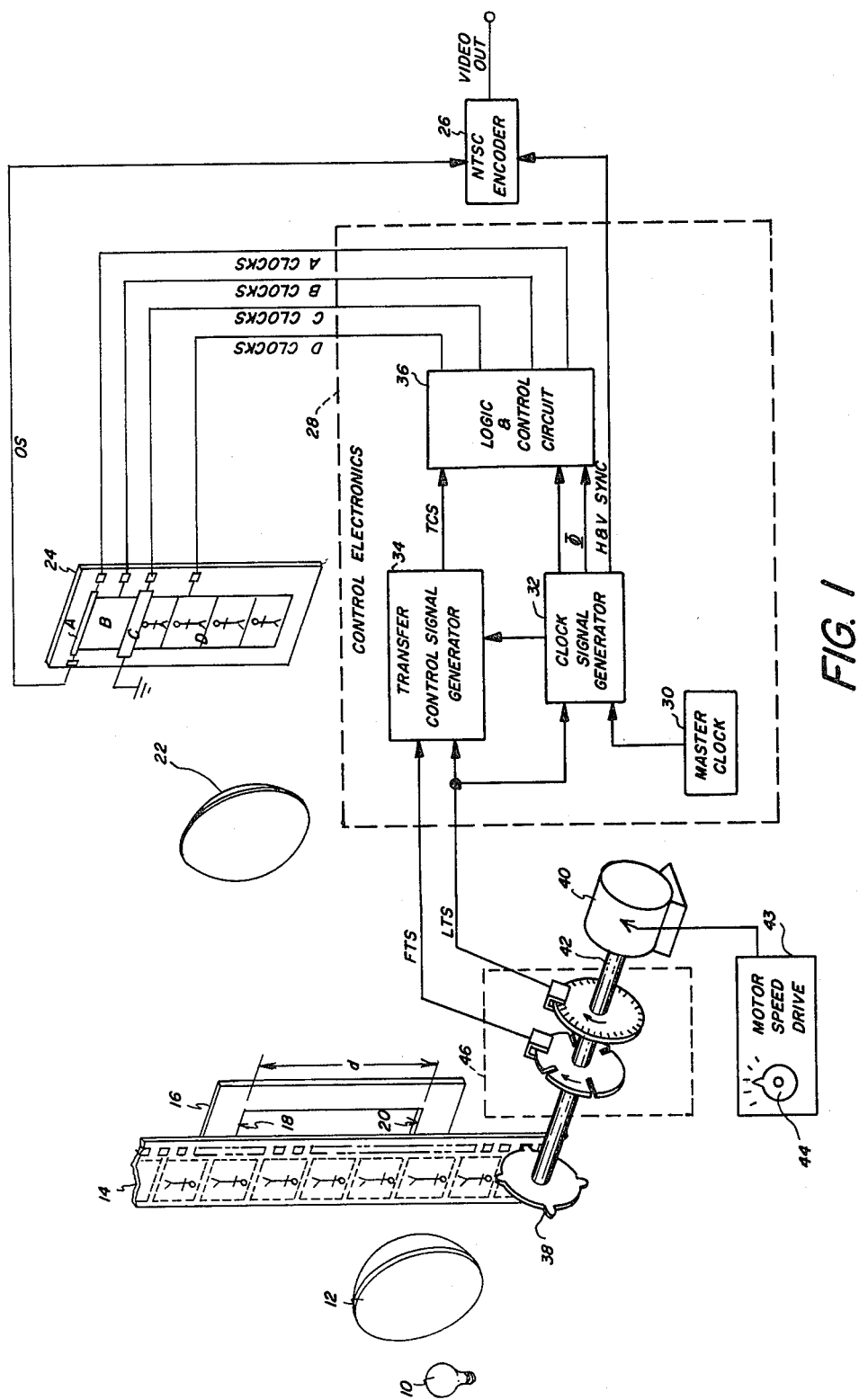
FIG. 1 is a schematic diagram showing film scanning apparatus according to the present invention.

The frame-rate converting film scanner according to the present invention (shown schematically in FIG. 1) includes a light source 10 and a condensing lens 12 for illuminating a portion of motion picture film 14 disposed in a film gate 16. The distance d between a top edge 18 and a bottom edge 20 of the opening in the film gate is three frame heights. Light from the film gate is imaged by an objective lens 22 onto a solid state image sensor 24. The solid state image sensor 24 includes an output register A, a temporary frame storage array B, a drain gate C, and an image sensing array D. The height of the image sensing array D is commensurate with the height of the opening in the film gate, i.e. three film frames. Since imaging optics 22 inverts the image of the film gate, the image of the bottom edge of the gate coincides with the top edge of the sensing array as shown in FIG. 1. An output signal OS produced by the image sensor 24 from output register A is supplied to an NTSC encoder 26 where horizontal and vertical synchronization signals are added in a known manner to produce a standard television signal. Clock signals for controlling image sensor 24, along with the synchronization signals used by NTSC encoder 26 are developed by control electronics 28. The control electronics includes a master clock 30, a clock signal generator 32, a transfer control signal generator 34, and a logic and control circuit 36.

The film 14 is moved past gate 16 at a desired projection rate by a film drive sprocket 38, driven by a film drive motor 40 through a drive shaft 42. A motor speed drive circuit 43 controls the speed of motor 40 in response to the operator's selection of a projection speed via dial 44, in a conventional manner. An encoder 46 connected to shaft 42 produces a frame tracking signal (FTS) comprising a pulse train exhibiting a pulse each time a film frame reaches a predetermined location relative to the film gate, such as the top edge 18 of the film gate, and a line tracking signal (LTS) comprising a pulse train having a predetermined number of pulses per frame. The number of pulses per frame in the line tracking signal LTS corresponds to the number of lines of sensing elements per frame possessed by image sensor 24 (e.g. 242 for standard television). The frame and line tracking signals are supplied to control electronics 28 for use in generating the clock signals that control image sensor 24.

Figure 2:
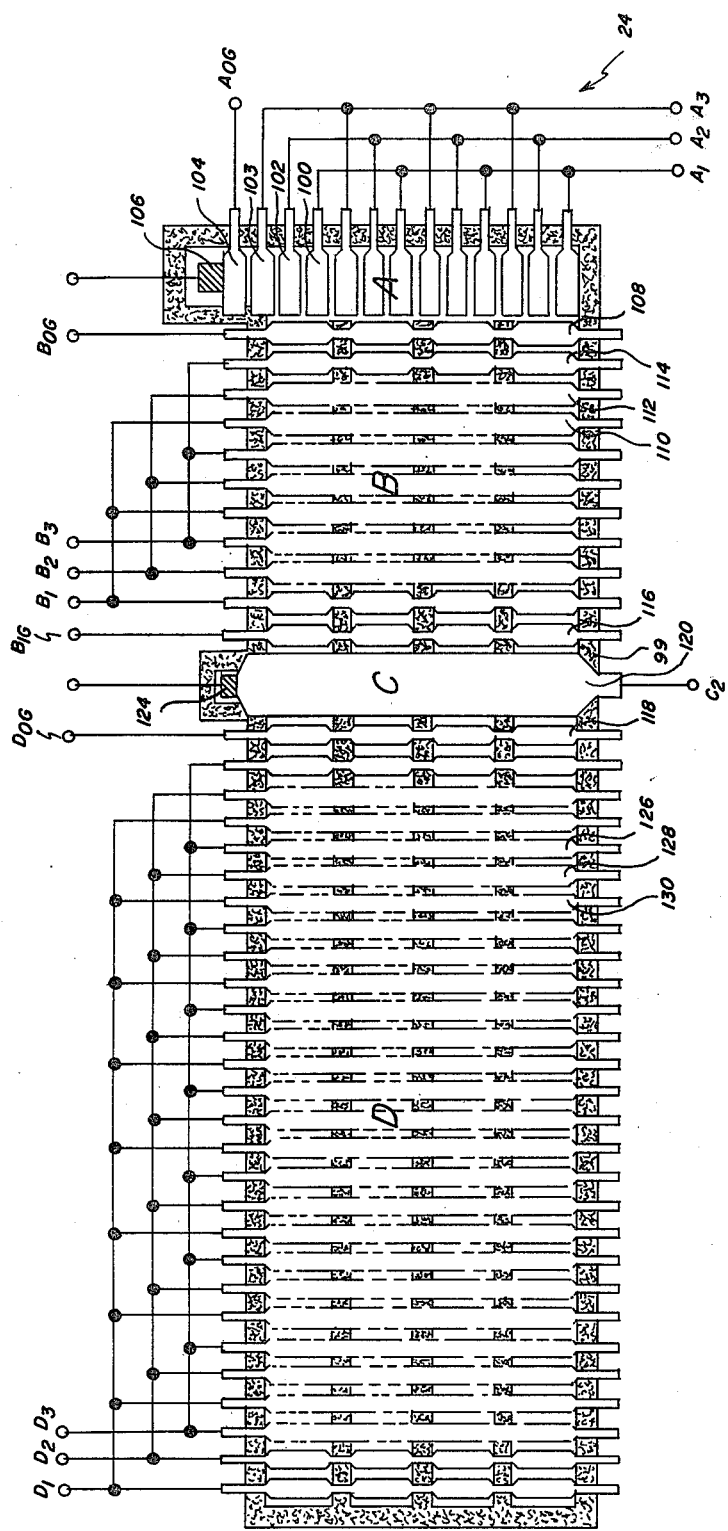
FIG. 2 is a schematic diagram of a frame transfer type solid state image sensor for use with film scanning apparatus according to the present invention.

Refer now to FIG. 2 where the solid state image sensor 24 according to the present invention, is shown in greater detail. Image sensor 24 is a charge coupled device (CCD) having a frame-transfer type configuration. Briefly, a CCD comprises a pattern of closely spaced electrodes disposed on, and electrically isolated from, the surface of a semiconductor material. When proper voltages are applied to the electrodes, potential wells, capable of holding and transferring packets of charge are formed under the electrodes. In the following description, a high voltage (e.g. 5 volts), when applied to an electrode, forms a potential well under the electrode, and a low voltage (e.g. 0 volts) collapses the well. When the semiconductor material is exposed to light, near where such a potential well is formed, charge carriers generated by the light are collected and held in the potential well. By manipulating the voltages on the electrodes, these packets of photocharge may be moved about within the CCD and in particular may be moved to a sensing location where they are sensed to form photosignals. Thus, CCD's are employed both as photosensors and as signal handling devices. See "Charge Transfer Devices" by Sequin and Tompsett, Academic Press, Inc., N.Y., 1975. The CCD image sensor 24 is shown having a three-phase electrode structure, but other electrode structures (for example, two-phase or four-phase) could be adapted to achieve the objectives of the present invention. The channels of the CCD device may be either surface or buried and the image sensing array D may be supplied with a color filter array in a known manner to yield a color image sensor. The image sensor is constructed on a chip of semiconductor material, commonly called a substrate. The stippled areas in FIG. 2 represent channel defining means such as channel stopping diffusions 99. The output register (register A) is a parallel-to-serial shift register having a set of three-phase transfer electrodes 100, 102 and 103, an output gate 104 and an output diode 106. The temporary storage array (array B) is a two-dimensional frame storage array disposed adjacent to output register A and having an output gate 108, a set of three phase transfer electrodes 110, 112 and 114, and an input gate 116. Drain gate C is disposed between the input gate 116 of frame storage array B and an output gate 118 of image sensing array D. Drain gate C includes a transfer electrode 120, and an output diode 124 surrounded by channel stopping diffusion 99. When drain gate C is operated at normal voltages (e.g. between 0 and +5 volts), it functions as a normal transfer gate in the CCD, and is capable of cooperating with output gate 118 and input gate 116 to transfer charge packets from the image sensing array D to the temporary storage array B. If a relatively high voltage (e.g. +20 volts) is applied to the drain gate, the effect of the channel stops is partially overcome, thereby creating a path across the device to diode 124 by which excess charge shifted under the drain gate from array D may be drained away. The image sensing array (array D) includes: a set of three-phase transfer electrodes 126, 128 and 130; and output gate 118. As noted above, image sensing array D is three frames high and consequently has three times as many sets of transfer electrodes as temporary storage array B.

The clock signals for controlling charge transfer in the registers and arrays A through D of the CCD image sensor 24 are generated by control electronics 28 (see FIG. 1). The signals supplied to the transfer gates 100, 102 and 103 and the output gate 104 of register A are designated $A_1$, $A_2$, $A_3$, and $A_{OG}$, respectively, in FIG. 2 and are collectively designated the "A clocks" in FIG. 1. Similarly, the control signals and clock signals of the B and D arrays are designated with subscripted capital letters in FIG. 2 and collectively referred by the corresponding capital letter in FIG. 1. The control signal for drain gate C is designated $C_2$ in FIG. 2 and called the C clock in FIG. 1.

Figure 3:
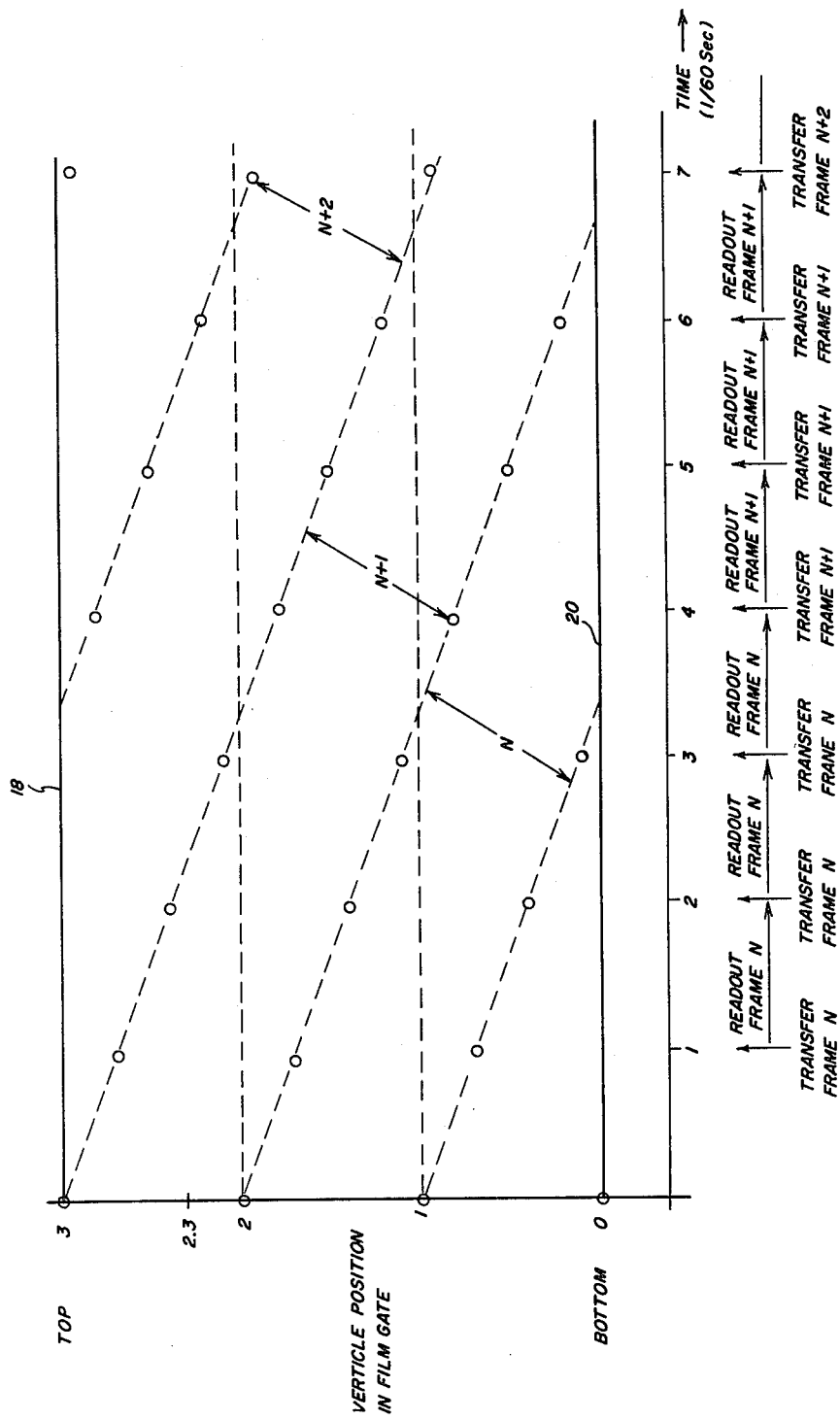
FIG. 3 is a timing diagram useful in explaining the operation of the film scanner according to the present invention.
Figure 5:
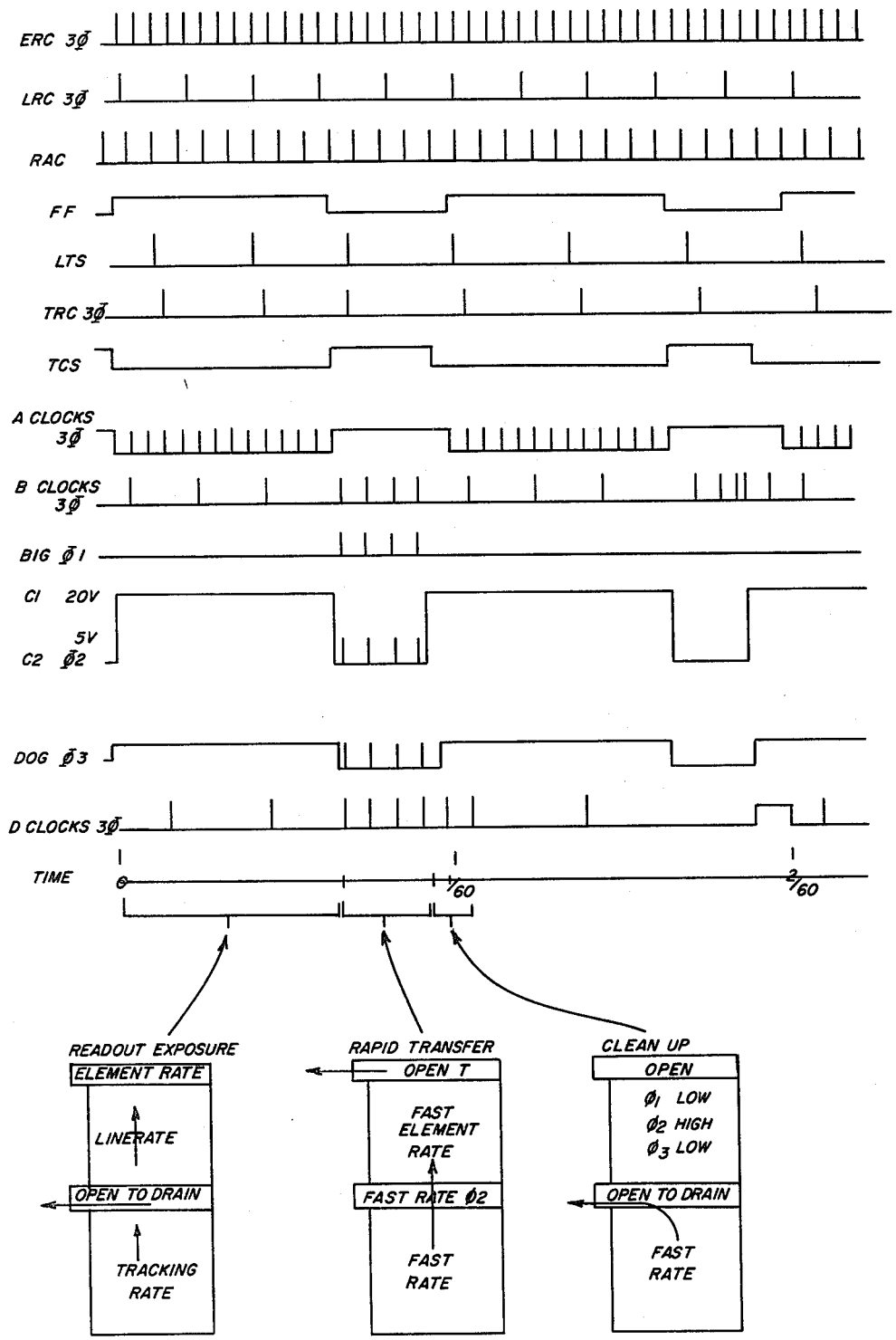
FIG. 5 is a clock waveform diagram illustrating the clock signals generated by the control electronics shown in FIG. 4.

The general principle of operation of the film scanner can be briefly explained with reference to the timing diagram of FIG. 3. For the sake of example, a projection rate of 18 frames per second has been selected, and the video output rate is 60 fields per second. In FIG. 3, the horizontal axis represents time and is divided into convenient units of 1/60 of a second. The vertical axis represents vertical position in the film gate and is divided into units of film frame height. The top and bottom of the film gate are represented by heavy horizontal lines 18 and 20, respectively. The dotted lines slanting down from left to right in FIG. 3 represent the top and bottom edges of successive film frames as the film is continuously moved through the film gate in the film scanner. The frames are numbered in an increasing sequence starting with N. At time T=0, frame N is just passing the center of the film gate. The image of the film gate with the moving film is projected on the imaging array D of image sensor 24. The frequency of the D clocks is such as to cause the imagewise charge pattern accumulated in array D to be shifted in concert with the motion of the image of the moving film, thereby tracking the motion of the film. At time T=1/60 of a second, the accumulated charge pattern in sensing array D representing frame N is rapidly shifted from array D, through drain gate C, into temporary frame storage array B. After the rapid transfer is complete, the charge pattern is read out of array B via output register A at the standard video rate. Meanwhile, the next pattern of photocharge is accumulated in array D. At time T=2/60, the charge pattern representing frame N has been completely read out of the storage array, and another accumulated charge pattern representing frame N is rapidly shifted into the temporary storage array B from sensing array D. The same sequence is repeated again at time T=3/60. At time T=4/60, part of the charge pattern for frame N is missing, so the scanning apparatus rapidly advances the charge pattern for frame N+1 into temporary storage array B. Thus, each cycle of the sensor is divided into three portions as illustrated at the bottom of FIG. 5. The three portions are: (1) readout/exposure; (2) rapid transfer; and (3) clean up. During the readout/exposure portion of a cycle, register A is operated at a TV element rate, array B is operated at a TV line rate, the voltage on drain gate C is high to provide an open path to the drain and array D is operated at a frame tracking rate. During the rapid transfer portion of the cycle, array B, drain gate C, and array D are all operated at the fast transfer gate. During the clean-up portion of the cycle, the phase 1 and 3 electrodes of array B are held low and the phase 2 electrodes are held high to temporarily store the imagewise charge pattern. The voltage on drain gate C is high to provide a path to the drain and array D is operated at the fast transfer rate to remove any residual charge remaining in array D. Scanning continues in this manner, always rapidly shifting the first available full frame's worth of charge pattern from sensing array D into temporary storage array B. In this way, the frame rate is automatically converted from the projection rate to the standard video rate without the need for any complicated electronics to calculate beforehand exactly how many times to repeat the scan of each frame.

It may be noticed from the example shown in FIG. 3 that the film gate height of three frames is greater than necessary to accomplish the frame-rate conversion. In fact, in the example shown, none of the charge pattern accumulated in the region of the image sensing array corresponding to the region in the film gate extending from 2.3 to 3.0 ever gets shifted into the temporary storage array B to be read out. Indeed, for projection rate of 18 frames per second, the film gate and image sensing array need be only 2.3 frames high. A study of timing diagrams similar to FIG. 3, using different projections rates, however, reveals that, in general, the film gate and image sensing array need to be $2+X/Y$ frames high where X is the desired maximum projection rate in frames per second and Y is the standard video field rate in fields per second. Thus for the present example, where the film gate and imaging area are three frames high, the maximum projection rate is 60 frames per second—since $2+60/60$ equals 3. The projection rate can be continuously varied between zero and 60 frames per second and the scanning apparatus will automatically provide frame-rate conversion at any of these projection rates.

It is apparent from the general description of operation outlined above, that the film scanner must "know" at any given time the position of the film frames relative to the film gate, if a full frame of accumulated photocharge is to be properly advanced into the storage array B. Keeping track of the film position, and determining how far to advance the accumulated charge pattern during a rapid advance into the temporary storage array B is the main function of the control electronics 28.

Figure 4:
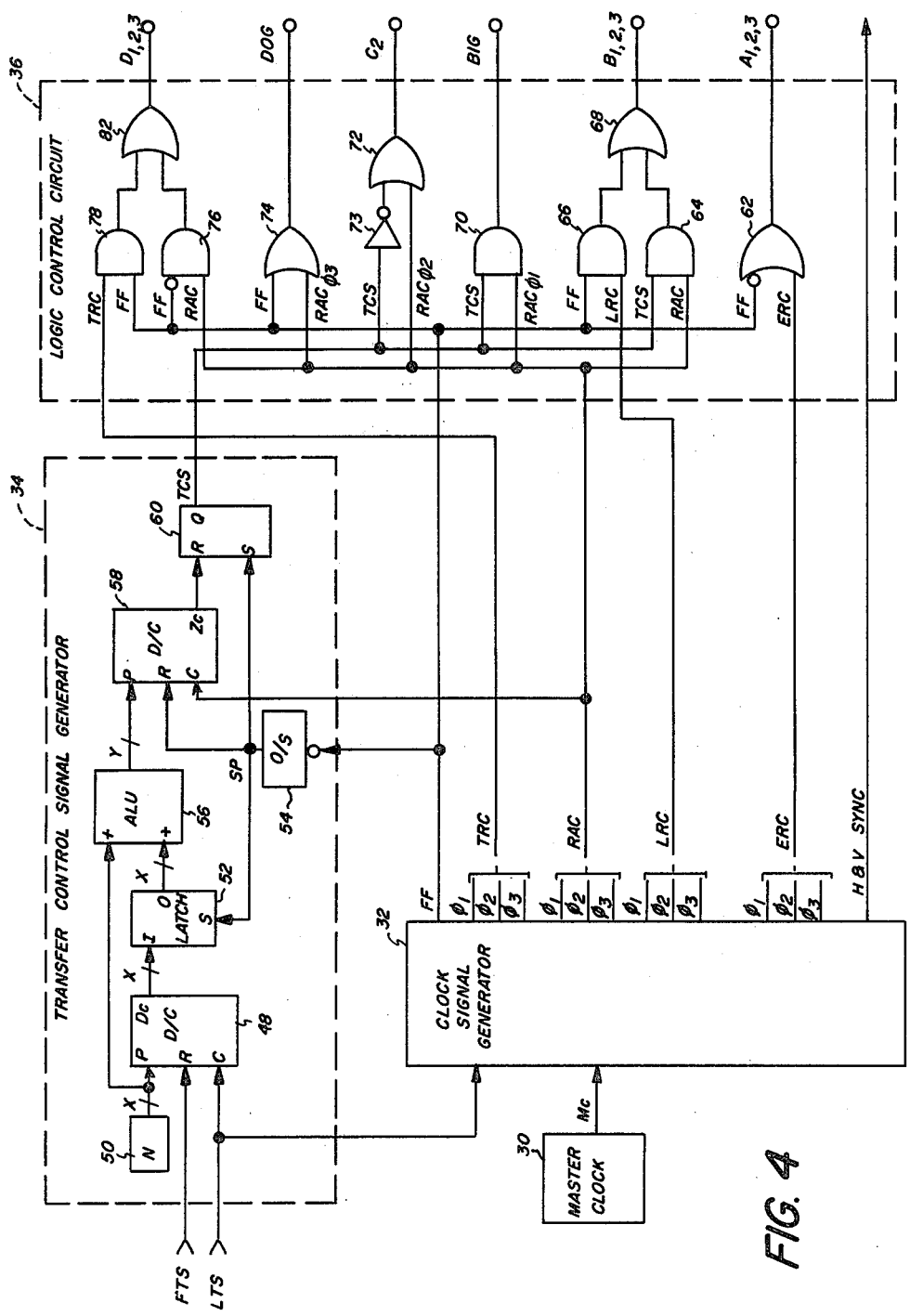
FIG. 4 is a schematic circuit diagram of the film scanner control electronics.

Generation of the clock signals by control electronics 28 will now be described with reference to FIGS. 4 and 5. Turning first to FIG. 4, a master clock 30 supplies a well regulated master frequency MC (e.g. 14.32 MHz) to the clock signal generator 32. Clock signal generator 32 employs the master clock signal MC to produce: a three-phase element rate clock signal ERC (e.g. 6 MHz); a three-phase line rate clock signal LRC e.g. (200 KHz); a three-phase rapid advance rate clock signal RAC (e.g. 1 MHz) and a frame flag FF in a known manner. These signals are shown schematically in FIG. 5. Each spike in the schematic diagram of the ERC, LRC and RAC signals shown in FIG. 5 represents one full cycle of the three-phase clock signal. In between each cycle of the LRC signal, phase 2 remains high while phase 1 and phase 3 are low. The frame flag FF is high during the video portion of a frame, when a charge pattern is being read out of the sensing array, and is low during a period corresponding to the vertical retrace time of a standard video signal, during which a charge pattern is rapidly advanced, into the temporary storage array B.

The clock signal generator 32 is also responsive to the line tracking signal LTS to produce a three-phase tracking rate signal TRC, which when applied to array D, will cause the charge pattern in array D to shift in tracking relation with the moving image of the film frames in the film gate.

The transfer control signal generator 34 is responsive to the frame and line tracking signals FTS and LTS from encoder 46, the phase 1 component of the rapid advance rate clock RAC, and the frame flag FF to produce a transfer control signal TCS (shown in FIG. 5). The transfer control signal TCS goes high at the start of the rapid advance of photocharge from array D into temporary storage array B and remains high for the time required to transfer the number of lines required to center a full frame of charge pattern in array B. The transfer control signal generator 34 includes a down counter 48 having preset, reset and count inputs labelled P, R and C, respectively. The preset input receives an X bit (e.g. 7) digital number N (e.g. 242) from a digital number generator 50. N is the digital representation of the number of active lines in a video field. The reset and count inputs of down counter 48 receive the frame tracking signal FTS and the line transfer signal LTS, respectively, from encoder 46. When a pulse is received on the reset input of down counter 48, the output $D_c$ of the counter assumes the value N that is supplied to the preset input. Each time a pulse is received on the count input, the value at the output $D_c$ decreases by one. Thus the output of down counter 48 provides a line-by-line running indication of the relative position of the film frames in film gate 16. The output of down counter 48 is supplied to an X bit terminal I of a latch circuit 52 also having a sample input S and an X bit output terminal O. When a pulse SP is applied to the sample input S of latch 52, the signal supplied to the input terminal I of the latch is sampled and held on the output terminal O. The sample pulse SP is generated in response to the negative going transitions of the frame flag FF by a one shot circuit 54 having an inverting input represented by the small circle in FIG. 4. The value present on the output terminal of latch 52 represents the number of lines remaining from the last frame to the next full frame in the sensing array D. The output of the latch circuit 52 is supplied to one input terminal of an arithmetic logic unit ALU 56. ALU 56 also receives the number N from digital number generator 50 on another input terminal and is responsive to the input signals to produce a Y bit (e.g. 8) digital output signal representing the sum of the digital inputs. The Y bit output signal represents the number of lines to be shifted from the image sensing array D into the temporary storage array B to insure that a full frame's worth of charge pattern is properly centered in temporary storage array B. The Y bit output word from ALU 56 is supplied to the preset input of a down counter 58. Down counter 58 has an output $Z_c$ that goes positive whenever the count in the down counter reaches zero. The sample pulse SP generated by one shot 54 is supplied to the reset input of down counter 58 to reset the internal count of the counter to the value supplied to the preset. The phase 1 component of the rapid advance rate clock RAC is supplied to the clock input of down counter 58 so that the down counter decrements each time the rapid advance rate clock signal goes through one cycle. As described below, the rapid advance rate clock signal RAC is employed to effect the rapid transfer of charge packets from array D to temporary storage array B, hence down counter 58 counts down the number of lines of charge transferred between array D and array B starting with the total number of lines to be transferred and producing a transition on output $Z_c$ when the count reaches zero. The output of down counter 58 is supplied to the reset input of a flip-flop 60. The sample pulse SP produced by one shot 54 is supplied to the set input of flip-flop 60. The output of flip-flop 60 is a tracking control signal TCS that goes high to signal the beginning of rapid transfer of photocharge from array D to array B, and goes low to signal the end of the rapid transfer. The transfer control signal TCS along with the clock signals and other control signals produced by clock signal generator 32 are supplied to logic and control circuit 36 to produce the gated clock signals employed to drive the image sensor 24. The operation of the logic and control circuit is illustrated schematically in FIG. 4 by standard logic gates. For clarity of description, only one gate, or set of gates, is shown for each three-phase clock signal. In the actual circuit, there would be one gate (or set of gates) for each phase of the signal.

An OR gate 62 (having one inverting input indicated by the small circle in FIG. 4) produces the A clocks by implementing the logical OR function between the inverse of the frame flag FF and the element rate clocks ERC. During readout of the temporary storage array B, the A clocks comprise the three-phase element rate clock signals to read out the lines of photocharge packets from register A. During the rapid transfer portion of the operation cycle of the image sensor, all three phases of the A clocks are high so that excess charge packets from portions of frames preceding the first full frame are shifted out the top end of the storage array B through register A.

The B clocks are produced by (1) implementing the logical AND function between the transfer control signal TCS and the rapid advance rate clock RAC in AND gate 64 to produce a first output; (2) implementing the logical AND function between the frame flag FF and the line rate clock signal LRC in AND gate 66 to produce a second output; and (3) by implementing the logical OR function between the first and second outputs in OR gate 68. The B clocks comprise the three-phase rapid advance rate clocks RAC during the time that the transfer control signal TCS is high and comprise the line rate clocks LRC during the time that the frame flag signal FF is high, during the remainder of a cycle, $\Phi_2$ is high and $\Phi_1$ and $\Phi_3$ are low, as shown in FIG. 5. The B clocks also include a constant bias signal $B_{OG}$ (not shown in FIG. 4) which is applied to output gate 108 of the B array. The signal $B_{IG}$ applied to input gate 116 of the B array is produced by implementing the logical AND function between the transfer control signal TCS and phase 1 of the rapid advance rate clock RAC in AND gate 70 to produce a signal that is low during readout of array B to isolate array B from array D and is phase 1 of the rapid advance rate clock during rapid transfer of the photosignal from array D to array B, thereby causing gate 116 to act as a phase 1 transfer electrode during rapid transfer. The signal $C_2$ applied to the transfer electrode 120 of the drain gate C is formed by implementing the logical OR function between the inverse of the transfer control signal TCS, amplified to +20 volts by inverting amplifier 73, and phase-2 of the rapid advance rate clock RAC in OR gate 72. Thus during the readout/exposure and the clean up portions of a cycle, $C_2$ is high (e.g. +20 volts) to provide a path to diode 124 (see FIG. 2) for lines of charge shifted out of array D due to the tracking motion of the charge pattern. During the rapid transfer of charge pattern from array D to array B, electrode 120 acts as a phase-2 transfer electrode in transferring lines of charge into the storage array B. During the clean up portion of the cycle, the high potential on electrode 120 provides a path to diode 124 to clear the remaining charge pattern from sensing array D. The signal $D_{OG}$ applied to the output gate 118 of the sensing array D is produced by implementing the logical OR function between the frame flag signal FF and phase-3 of the rapid advance rate clock RAC in OR gate 74. Thus, during the readout/exposure portion of a cycle, output gate 118 allows excess charge to flow into drain gate C and during rapid transfer of photocharge from array D to array B output gate 118 acts as a phase-3 transfer electrode. The D clocks are produced by implementing: (1) the logical AND function between the frame flag FF and the tracking rate clock TRC in AND gate 78 to produce a first intermediate output; (2) the logical AND function between the rapid advance rate clock RAC and the inverse of the frame flag FF in AND gate 76 to produce a second intermediate output; and (3) the logical OR function on the outputs of AND gates 78 and 76 by OR gate 82. The D clocks comprise the tracking rate clock TRC during the readout/exposure portion of a cycle and the rapid advance rate clock RAC during the rapid transfer portion of a cycle.

Standard field interlace may be provided according to the well known technique of integrating photocharge under one set of electrodes during even fields, and under two sets of electrodes during odd fields, as described in Sequin & Tompsett (supra) at page 157. This is accomplished by changing the phase of the tracking rate clock signals 180° between each field.

The invention has been described in detail with reference to a preferred embodiment, however, it will be understood that variations and modifications can be effected within the spirit and scope of the invention. For example, the film scanner may be adapted to operate in reverse by providing another drain gate at the opposite end of array D from drain gate C and by operating array D in a film tracking mode during the readout/exposure portion of a cycle whereby charge pattern would be shifted away from drain gate C, excess charge being shifted out of array D into the new drain gate. The direction of charge motion would be reversed during the fast transfer portion of the cycle to shift a full frame of charge from array D into array B.

We claim:

1. A film scanner for producing a standard television signal from a motion picture film, comprising:
    (a) means for continuously moving the film at X frames per second and for projecting an image of a portion of the moving film, said portion being at least $2+X/Y$ film frames, where Y is the standard television field rate;
    (b) image sensing means disposed to receive said projected image and responsive thereto for forming a two-dimensional imagewise charge pattern representative thereof;
    (c) means for moving said imagewise charge pattern during formation thereof in said image sensing means to track the motion of the film image;
    (d) temporary storage means, connected to said image sensing means for storing a portion of said imagewise charge pattern representing one full film frame;
    (e) means for moving a portion of said imagewise charge pattern representing one full film frame from said image sensing means into said temporary storage means; and
    (f) means for reading said portion of said imagewise charge pattern out of said temporary storage means at a standard video rate for producing a standard video signal.

2. A film scanner for producing a standard television signal from motion picture film, comprising:
    (a) a projector having: (1) a film gate, (2) a film drive for continuously moving the film past the film gate at X frames per second, and (3) optics for forming a projected image of the film moving past the gate, said image comprising at least $2+X/Y$ film frames, where Y is the standard video field rate;
    (b) a frame transfer type CCD image sensor having: (1) a two-dimensional image sensing array disposed to receive said projected image and responsive thereto for forming an imagewise charge pattern in said array, said image sensing array being $2+X/Y$ frames high, (2) a two-dimensional temporary storage array for storing a portion of said imagewise charge pattern, (3) drain gate means disposed between said sensing array and said storage array and operable in a first mode for transferring said imagewise charge pattern from said image sensing array to said storage array and operable in a second mode for draining said imagewise charge pattern from said image sensing array, and (4) a readout register connected to said storage array for reading out said imagewise charge pattern to produce a television signal; and
    (c) control electronics having means for generating: (1) a first set of control signals supplied to said image sensing array to control said image sensing array to shift said imagewise charge pattern through said sensing array during formation thereof in concert with the movement of the image and for shifting said imagewise charge pattern out of said sensing array after formation of the charge pattern, (2) a second set of control signals supplied to said temporary storage array to shift said imagewise charge pattern into said storage array from said sensing array, and to shift said charge pattern out of said storage array at a standard video rate, (3) a third set of control signals supplied to said drain gate means to cause said drain gate means to operate in said first mode when an imagewise charge pattern is being shifted out of said sensing array at said fast rate and to operate in said second mode when an imagewise charge pattern is being shifted through said image sensing array in concert with movement of said image, and (4) a fourth set of control signals supplied to said readout register to shift a stored charge pattern out of the storage array at the standard video rate and to dump lines of charge when a charge pattern is being shifted into said storage array.

3. A method of producing a standard television signal from a motion picture film, comprising the steps of:
    (a) continuously moving the film at X frames per second, and projecting an image of a portion of the moving film, said projected portion being at least $2+X/Y$ frames, where Y is the standard video field rate;
    (b) sensing the projected image in an area array image sensor and forming in response thereto an imagewise charge pattern representative thereof;
    (c) moving said imagewise charge pattern in said image sensor during formation thereof in tracking relation with the continuous motion of the film;
    (d) temporarily storing a portion of said imagewise charge pattern representing one full film frame;
    (e) removing said charge pattern from storage at a standard video rate to produce a standard video signal therefrom.

4. A solid-state, charge-coupled device, image sensor of the frame-transfer type for use in a film scanner for producing a television signal from the projected image of a continuously moving motion picture film, comprising:
    (a) a substrate of semiconductor material;
    (b) a first pattern of electrodes and channel stops disposed on said substrate defining a two-dimensional array of image sensing elements having a width equal to the width of the projected image of a film frame and a height at least equal to the projected image of $2+X/Y$ film frames, where X is the projection rate of the film in frames per second and Y is the field rate of the standard video signal in fields per second, said image sensing array being responsive to an imagewise pattern of light for producing an imagewise pattern of photosignals;

(c) a second pattern of electrodes and channel stops disposed on said substrate defining a two-dimensional array of signal storage elements, equal in width to the image sensing array, and equal in height to the projected image of one film frame;

(d) a third pattern of electrodes, channel stops, and diode means disposed on said substrate defining means disposed between said image sensing array and said signal storage array and operable in a first mode for transferring photosignals from said image sensing array to said signal storage array and operable in a second mode for dumping photosignals from said image sensing array; and (e) a fourth pattern of electrodes, channel stops, and diode means disposed on said substrate defining an output register connected to said storage array for reading photosignals out of said storage array.

* * * * *